(12) United States Patent
Ikonomov

(10) Patent No.: US 11,341,182 B2
(45) Date of Patent: May 24, 2022

(54) ELECTRONIC ARTICLE SELECTION DEVICE

(71) Applicant: Artashes Valeryevich Ikonomov, Moscow (RU)

(72) Inventor: Artashes Valeryevich Ikonomov, Moscow (RU)

( * ) Notice: Subject to any disclaimer, the term of this patent is extended or adjusted under 35 U.S.C. 154(b) by 10 days.

(21) Appl. No.: 15/761,190

(22) PCT Filed: Sep. 16, 2016

(86) PCT No.: PCT/RU2016/050035
§ 371 (c)(1),
(2) Date: Jun. 19, 2018

(87) PCT Pub. No.: WO2017/048158
PCT Pub. Date: Mar. 23, 2017

(65) Prior Publication Data
US 2018/0329929 A1    Nov. 15, 2018

(30) Foreign Application Priority Data

Sep. 17, 2015  (RU) ............................ RU2015139541

(51) Int. Cl.
*G06F 16/00* (2019.01)
*G06F 16/532* (2019.01)
(Continued)

(52) U.S. Cl.
CPC ........ *G06F 16/532* (2019.01); *G06F 3/04815* (2013.01); *G06Q 30/0621* (2013.01);
(Continued)

(58) Field of Classification Search
CPC .............. G06F 16/532; G06F 3/04815; G06K 9/00201; G06K 9/6201; G06T 17/00; G06Q 30/0621; H04L 67/12; G06V 20/64
See application file for complete search history.

(56) References Cited

U.S. PATENT DOCUMENTS 6,043,813 A *  3/2000  Stickney ................. G06T 17/00
                                                   345/473
7,149,665 B2 * 12/2006  Feld ........................ G06T 17/00
                                                   703/2
(Continued)

FOREIGN PATENT DOCUMENTS

EA   200970864 A1   4/2010
RU   2 499 292 C2  11/2013
(Continued)

OTHER PUBLICATIONS

International Search Report and Written Opinion dated Feb. 16, 2017 in corresponding application PCT/RU2016/050035 (with English translation; 17 pages).

(Continued)

*Primary Examiner* — Cesar B Paula
*Assistant Examiner* — David Faber
(74) *Attorney, Agent, or Firm* — Seckel IP, PLLC

(57) ABSTRACT

The invention relates to a field of data processing, and more specifically to electronic devices for selecting articles, that includes a server adapted for connection, by means of a unified network, with user client devices, said server comprising interconnected elements including a module for the input of a plurality of images of articles; connected thereto a module for producing a three-dimensional model of articles; a module for the input of a plurality of images of a bulk body, with which the articles to be selected are compared; connected thereto a module for producing a three-dimensional model of the bulk body; a database of articles with three-dimensional models of the articles in question; a database of bulk bodies with three-dimensional models of the bulk bodies in question; connected to the databases a module for comparing, on the same scale, the three-dimen- (Continued)

sional model of the bulk body and the three-dimensional model of articles; and, connected thereto, a module for sending the results of the comparison to the user client devices. According to the invention, the electronic device comprises a module for identifying the bulk body according to the three-dimensional model of the bulk body, said module being connected to the module for producing the three-dimensional model of the bulk body and the database of bulk bodies with three-dimensional models of the bulk bodies in question. The electronic device also comprises a module for selecting from the database of articles with three-dimensional models of the articles in question those articles which match the bulk body inputted into the electronic device both in terms of the correspondence of the three-dimensional model and in terms of the suitability of the articles for use especially with the bulk body in question, said module being connected to the module for identifying the bulk body according to the three-dimensional model of the bulk body and to the module for sending the results of the comparison to the user client devices. The achieved technical result consists in an automatic selection of articles both in terms of the correspondence of the three-dimensional model and in terms of the suitability of the articles for use especially with the bulk body in question, which is the technical objective.

6 Claims, 1 Drawing Sheet

(51) Int. Cl.
*G06T 17/00* (2006.01)
*G06Q 30/06* (2012.01)
*G06V 20/64* (2022.01)
*G06F 3/04815* (2022.01)
G06K 9/62 (2022.01)
H04L 67/12 (2022.01)

(52) U.S. Cl.
CPC .............. *G06T 17/00* (2013.01); *G06V 20/64* (2022.01); *G06K 9/6201* (2013.01); *H04L 67/12* (2013.01)

(56) References Cited

U.S. PATENT DOCUMENTS

| | | | | |
|---|---|---|---|---|
| 8,525,828 B1* | 9/2013 | Bates | ................ | G06T 15/00 345/419 |
| 8,700,477 B2* | 4/2014 | Wolper | ................ | G09G 3/003 705/26.1 |
| 2001/0026272 A1* | 10/2001 | Feld | ................ | G06T 17/00 345/419 |
| 2002/0010655 A1* | 1/2002 | Kjallstrom | ............. | G06Q 30/02 705/26.62 |
| 2002/0105530 A1* | 8/2002 | Waupotitsch | ........ | G02C 13/003 345/630 |
| 2005/0162419 A1* | 7/2005 | Kim | ................ | G06T 15/00 345/419 |
| 2009/0113349 A1* | 4/2009 | Zohar | ............... | G06Q 30/00 715/852 |
| 2009/0144173 A1* | 6/2009 | Mo | ................ | G06N 3/006 705/26.1 |
| 2009/0222127 A1 | 9/2009 | Lind | | |
| 2010/0070384 A1 | 3/2010 | Kruusmaa et al. | | |
| 2010/0111370 A1* | 5/2010 | Black | ................ | G06T 7/75 382/111 |
| 2011/0298897 A1 | 12/2011 | Sareen et al. | | |
| 2012/0299912 A1* | 11/2012 | Kapur | ................ | G06F 3/017 345/419 |
| 2013/0110469 A1* | 5/2013 | Kopelman | ............. | G06T 19/20 703/1 |
| 2013/0215116 A1* | 8/2013 | Siddique | ............ | G06Q 30/0643 345/420 |
| 2013/0259308 A1 | 10/2013 | Klusza et al. | | |
| 2014/0176565 A1* | 6/2014 | Adeyoola | ............. | G06T 19/006 345/473 |
| 2014/0257993 A1* | 9/2014 | Paolini | ............... | G06Q 10/0637 705/14.66 |
| 2014/0279192 A1 | 9/2014 | Selby | | |
| 2015/0134496 A1* | 5/2015 | Grinblat | ................ | G06T 19/00 705/27.2 |
| 2015/0154691 A1* | 6/2015 | Curry | ................ | G06Q 30/0643 705/27.2 |
| 2015/0379623 A1* | 12/2015 | Gadre | ................ | G06Q 30/0641 705/27.2 |
| 2016/0155263 A1 | 6/2016 | Ikonomov | | |
| 2017/0024928 A1* | 1/2017 | Su | ................ | G06Q 30/0621 |

FOREIGN PATENT DOCUMENTS

| | | |
|---|---|---|
| RU | 2 504 009 C1 | 1/2014 |
| RU | 2504009 C1 | 1/2014 |
| RU | 148909 U1 | 12/2014 |
| WO | 2010/024486 A1 | 3/2010 |

OTHER PUBLICATIONS

International Search Report (ISR) and Written Opinion dated Feb. 19, 2015 issued in application No. PCT/RU2014/000873; w/ English partial translation and machine translation (10 pages).

\* cited by examiner

ELECTRONIC ARTICLE SELECTION DEVICE

TECHNICAL FIELD OF INVENTION

The invention relates to a field of data processing, and more specifically to electronic devices for selecting articles, that includes a server adapted for connection, by means of a unified network, with user client devices, said server comprising interconnected elements including a module for the input of a plurality of images of articles; connected thereto a module for producing a three-dimensional model of articles; a module for the input of a plurality of images of a bulk body, with which the articles to be selected are compared; connected thereto a module for producing a three-dimensional model of the bulk body; a database of articles with three-dimensional models of the articles in question; a database of bulk bodies with three-dimensional models of the bulk bodies in question; connected to the databases a module for comparing, on the same scale, the three-dimensional model of the bulk body and the three-dimensional model of articles; and, connected thereto, a module for sending the results of the comparison to the user client devices.

Following terms are used in this description:

The server is an electronic device that performs service functions at the client's request by providing access to specific resources. For the purpose of this description, it is considered a server having a permanent connection with a unified network, said network being capable to send data from client devices to the server. The server can process these data and send the result back to the client device.

The unified network and all connections between all modules and units include diverse topologies, configurations and arrangements of internetwork connection components built so as to connect corporate, global and local computing networks, including but not limited to conventional wired networks, wireless, satellite, optic and equivalent network solutions.

The module for the input of images or other data is a server's module capable of acting as a receiver for incoming signals and converting the same for further processing.

A computation module is a server's module which is a microprocessor specially adapted to process signals.

The database or a database storage module is a server's module for storage of data corresponding to this module, said module may be a hard disk drive or a flash memory, which is essentially an electrically alterable memory semiconductor.

At the same time, individual modules may be combined for specific embodiments. For example, different databases may be stored inside a single memory module.

The bulk body is any object and subject, or part thereof, having spatial boundaries. Desired goods are compared with and matched to the bulk body. The parameters used for matching are shape, size and other geometrical parameters, and color. The bulk body may be a residential premises, a room or part thereof, an object, more particularly, user's clothes. On the other hand, the user himself or herself or his/her body parts (arm, leg, etc) may be the bulk body.

A three-dimensional model matchability is a situation where the three-dimensional model of the bulk body corresponds the three-dimensional volume of an article. At the same time, one three-dimensional model cannot exceed the boundaries of another three-dimensional model, or a situation where two different three-dimensional models are imposed against each other, and one three-dimensional model fails to fully enter the inner space of another three-dimensional model, several points of the first three-dimensional model being outside the second three-dimensional model. For example, trying on a shoe where a three-dimensional model of the buyer's foot does not fit the three-dimensional model of the shoes being tried.

An article-to-bulk body matchability by suitability is a situation where the offered article is applied for or together with the bulk body. For example, if a user's foot is inputted, shoes can be offered as an article matching by suitability. If a fragment of premises having a room of a predefined size is introduced, furniture, or, more specifically, sofa or armchair, can be offered as an article matching by suitability. If a hole in the wall is introduced, fixtures, such as dowels or screws, can be introduced as articles matching by suitability.

PRIOR ART

Internet commerce is becoming increasingly popular thanks to its convenience (no need to go out) and low prime cost (the goods can be sold with a small markup). The only obstacle to its further growth is that the buyer's physical presence is a must for trying on articles. However, the emergence of three-dimensional modules of articles and three-dimensional models of buyer's body or his/her property to match with the articles made it possible to select and fit these groups of goods, namely, clothes and shoes, remotely.

A known example of prior art is an electronic device for selecting articles, that includes a server adapted for connection, by means of a unified network, with user client devices, said server comprising interconnected elements including a module for the input of a plurality of images of articles; connected thereto a module for producing a three-dimensional model of articles; a module for the input of a plurality of images of a bulk body, with which the articles to be selected are compared; connected thereto a module for producing a three-dimensional model of the bulk body; a database of articles with three-dimensional models of the articles in question; a database of bulk bodies with three-dimensional models of the bulk bodies in question; connected to the databases a module for comparing, on the same scale, the three-dimensional model of the bulk body and the three-dimensional model of articles; and, connected thereto, a module for sending the results of the comparison to the user client devices (see utility model patent, RU No 148909, published on Dec. 20, 2014).

The above device is the closest to the essence and technical result of the claimed invention and is assumed herein as a prototype of the claimed invention.

This device has a drawback, namely, that it is inconvenient in operation, as the buyer has to input the description of the bulk body on his/her own and transfer the images to the electronic device. In addition, the buyer has to input many other parameters for further search. Some of these parameters may not be comprehensible to the buyer.

DISCLOSURE OF THE INVENTION

The present invention relies on this novel observation with the primary aim to offer an electronic device for selecting articles that serves at least to mitigate one of the aforementioned drawbacks, namely, to provide automatic selection of articles both in terms of the correspondence of the three-dimensional model and in terms of the suitability of the articles for use especially with the bulk body in question, which is the technical objective.

For the purpose of reaching the above objective, the electronic device comprises a module for identifying the bulk body according to the three-dimensional model of the bulk body, said module being connected to the module for producing the three-dimensional model of the bulk body and the database of bulk bodies with three-dimensional models of the bulk bodies in question. The electronic device also comprises a module for selecting from the database of articles with three-dimensional models of the articles in question those articles which match the bulk body inputted into the electronic device both in terms of the correspondence of the three-dimensional model and in terms of the suitability of the articles for use especially with the bulk body in question, said module being connected to the module for identifying the bulk body according to the three-dimensional model of the bulk body and to the module for sending the results of the comparison to the user client devices.

These useful features make it possible:
to identify automatically the bulk body using its inputted images with the help of the module for identifying the bulk body according to the three-dimensional module of the bulk body;
to select automatically from the database of articles with three-dimensional models of articles in question those articles which match the bulk body inputted to the electronic device both in terms of the correspondence of the three-dimensional model and in terms of the suitability of the articles for use especially with the bulk body in question, using a dedicated module.

There is a version of the invention in which the module for selecting from the database of articles with three-dimensional models of the articles in question those articles which match the bulk body inputted into the electronic device has a block for generating signals to the user client devices to ask additional questions to the user in view to narrow the selection of articles.

This useful feature makes it possible to narrow down the matching articles until only one remains, and minimize the number of additional questions to accelerate the selection of the articles. When there is a wide selection of matching articles, it is more convenient to narrow it down, and this feature does it automatically, for example, by consecutive narrowing down from a group of articles.

The combination of the essential features of the claimed invention is not known from the prior art, therefore the invention possesses the required feature of novelty.

BRIEF DESCRIPTION OF THE DRAWINGS

Other distinguishing features and advantages of the invention are readily apparent from the description below which includes but is not limited to the following features, with reference to the figures attached.

Figure 1:
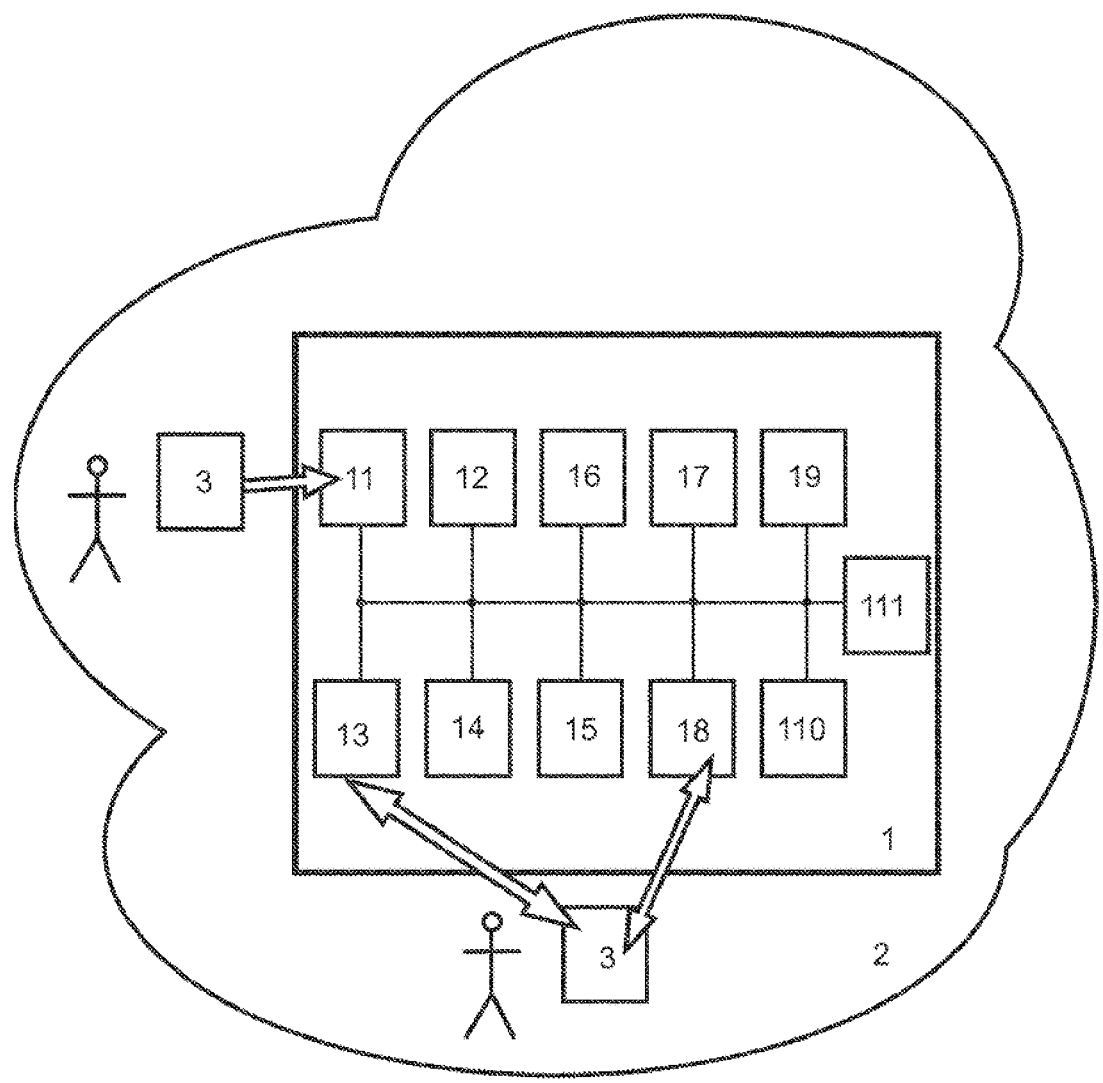
FIG. 1 is a functional diagram of the electronic device for selecting articles according to the invention.

According to the FIG. 1, an electronic device includes a server 1 adapted for connection, by means of a unified network 2, with user client devices 3, said server comprising interconnected elements including a module 11 for the input of a plurality of images of articles; connected thereto a module 12 for producing a three-dimensional model of articles; a module 13 for the input of a plurality of images of a bulk body, with which the articles to be selected are compared; connected thereto a module 14 for producing a three-dimensional model of the bulk body; a database 15 of articles with three-dimensional models of the articles in question; a database 16 of bulk bodies with three-dimensional models of the bulk bodies in question; connected to the databases a module 17 for comparing, on the same scale, the three-dimensional model of the bulk body and the three-dimensional model of articles; and, connected thereto, a module 18 for sending the results of the comparison to the user client devices 3.

The electronic device comprises a module 19 for identifying the bulk body according to the three-dimensional model of the bulk body, said module being connected to the module 14 for producing the three-dimensional model of the bulk body and the database 16 of bulk bodies with three-dimensional models of the bulk bodies in question. The electronic device also comprises a module 110 for selecting from the database of articles with three-dimensional models of the articles in question those articles which match the bulk body inputted into the electronic device both in terms of the correspondence of the three-dimensional model and in terms of the suitability of the articles for use especially with the bulk body in question, said module being connected to the module 19 for identifying the bulk body according to the three-dimensional model of the bulk body and to the module 18 for sending the results of the comparison to the user client devices.

The module 110 for selecting from the database of articles with three-dimensional models of the articles in question those articles which match the bulk body inputted into the electronic device has a block 111 for generating signals to the user client devices to ask additional questions to the user in view to narrow the selection of articles.

The databases of bulk bodies or articles may comprise data that could be represented as graphical codes, for example, QR codes or barcodes. These can be called a "passport" of the article or object. Such passport comprise an exhaustive information about the object they refer to, such as the material, country of manufacture, weight, price, other parameters, as well as three-dimensional model parameters.

Embodiment of the Invention

Figure 2:
FIG. 2 represents phases of functioning of the electronic device for selecting articles according to the invention.

The electronic device for selecting articles according to user-defined parameters works as follows. (A non-limiting example of embodiment is provided). According to FIG. 2:

Phase A1. Preliminary, the user client devices 3 are connected to the claimed device 1 via the unified network 2.

Phase A2. The users who sell articles, or the sellers, are able to upload to the claimed electronic device using the module 11 several diverse images of articles, for example, pictures taken from different angles. Besides images as such, scanned 3D models of the articles in any format (e.g. AUTOCAD or any other format) can also be uploaded and then converted to the format required for comparison.

Phase A3. Using the module 12, the claimed electronic device automatically produces a three-dimensional model of the articles and saves these models in the database 15 of articles with three-dimensional models of the articles in question.

Phase A4. The users who select articles, or the buyers, are able to upload to the claimed electronic device using the input module 13 several images of the bulk body to compare it against the selected articles. The user's personal effects, e.g. his/her clothes, residential or office premises or part thereof, as well as the user himself/herself and his/her body parts, such as feet, arms, head or body, can be such a bulk body. A hole drilled in the wall can be a bulk body in question.

Phase A5. Using the module 14 for producing a three-dimensional model of the bulk body, the claimed device automatically builds a three-dimensional model of the bulk body and stores it in the database 16 of bulk bodies with three-dimensional models of the bulk bodies in question. Besides images as such, scanned 3D models of the articles in any format (e.g. AUTOCAD or any other format) can be uploaded and then converted to the format required for comparison.

Phase A6. Using the module 19, the electronic device automatically identifies the bulk body by its three-dimensional model of the bulk body. In other words, the user transfers only images, while the electronic device is responsible for determining the type of the bulk body and its parameters, such as real dimensions.

Phase A7. Using the module 110, the electronic device automatically selects from the database 15 those articles which match the bulk body inputted into the electronic device both in terms of the correspondence of the three-dimensional model and in terms of the suitability of the articles for use especially with the bulk body in question. For example, if the images of the hole are introduced, search will be made in the database by its real dimensions determined as described in the previous phase, and the matching articles will be fixtures, such as screws or dowels. It stands to reason that the three-dimensional model of the bulk body and the three-dimensional model of the articles are compared using the same scale so that the articles selected will match the body by size, for example, the diameter of the dowel will match the diameter of the hole.

Phase A8. Where a multitude of such matches can be identified, the number of matching articles is narrowed down by grouping them using similar attributes and sending queries to user client devices in accordance with the sorting selection by attribute (e.g. material or manufacturer) or quantitative parameter (e.g. minimum price, minimum time of delivery or best quality).

Phase A9. In some cases, the phase A8 may be repeated several times to narrow down the selection even further using a number of attributes and parameters.

Phase A10. The result of the phase A9, namely, the article that matches the user's request by all criteria is sent to user client devices via the module 18.

Said embodiments of the invention are given herein by way of example and allow for new options or modifications. For example, several phases may be switched or omitted.

INDUSTRIAL APPLICABILITY

The claimed electronic device for selecting articles has a clear application, may be implemented in practice by one skilled in the art and ensures that the claimed objectives are met after implementation. The opportunity for practical embodiment of the invention by one skilled in the art results from the fact that for each feature included in the claims as based on the description, an equivalent material embodiment is known, which leads to the conclusion that the invention meets the requirement of "industrial applicability" and "complete disclosure".

According to the invention, an industrial prototype of the electronic device for selecting articles was made by the applicant using standard micro processors, memory modules, wired and wireless connections.

Trial runs of the prototype demonstrated that it is possible:
to input the source data in the electronic device, namely, several images of the bulk body,
to produce automatically a three-dimensional model of the bulk body,
to identify automatically the bulk body,
to identify automatically the articles which match said bulk body both in terms of the correspondence of the three-dimensional model and in terms of the suitability,
to narrow down the number of relevant articles in the event of a multitude of matches by generating a series of queries to the client devices,
to minimize a number of matches, e.g. to a single article,
to send data on the matches to the user client devices,
to visualize the articles in question on the user client device.

Thus, the above mentioned features serve to achieve the claimed technical result, namely: the automatic selection of articles both in terms of the correspondence of the three-dimensional model and in terms of the suitability of the articles for use especially with the bulk body in question, which is the technical objective.

The invention claimed is:

1. An electronic device for selecting articles, comprising a server adapted for connection, by means of a unified network, with user client devices, the server comprising a processor and a memory comprising interconnected elements including databases stored in the memory and modules stored in the memory and configured to be executed by the processor, the interconnected elements including:
   a module for receiving an input of a plurality of images of articles;
   connected thereto, a module for producing a-three-dimensional models of the plurality of articles from the plurality of images;
   a database of articles including stored three-dimensional models of articles, the module for producing the three-dimensional models of the plurality of articles being connected to the database of articles, wherein the module for producing three-dimensional models of the plurality of articles is adapted to store the produced three-dimensional models of the plurality of articles in the database of articles;
   a module for receiving, from a user, an input of a plurality of images of a bulk body, with which the articles to be selected are to be compared;
   connected thereto, a module for producing a three-dimensional model of the bulk body only from the input of the plurality of images of the bulk body;
   a database of bulk bodies including stored three-dimensional models of bulk bodies, the module for producing the three-dimensional model of the bulk body being connected to the database of bulk bodies, wherein the stored three-dimensional models of bulk bodies include stored three-dimensional models of (i) at least one of buildings, objects, or parts thereof, and (ii) at least one of human bodies or parts thereof;
   wherein each of the stored three-dimensional models of bulk bodies includes respective parameters of the respective bulk body;
   a module for identifying the bulk body according to the produced three-dimensional model of the bulk body produced only from the input of the plurality of images of the bulk body, the module for identifying the bulk body being connected to the module for producing the three-dimensional model of the bulk body and to the database of bulk bodies including the stored three-dimensional models of bulk bodies;

wherein the module for identifying the bulk body is configured to determine a type and parameters of the bulk body by identifying a correspondence of the produced three-dimensional model of the bulk body produced only from the input of the plurality of images with a corresponding stored three-dimensional model of the bulk body including parameters of the bulk body in the database of bulk bodies;

connected to the databases, a module for comparing, on a same scale, the three-dimensional model of the bulk body and the three-dimensional models of the articles, wherein the module for comparing is configured to compare the three-dimensional models of the articles to the three-dimensional model of the bulk body including parameters identified by the module for identifying the bulk body;

a module for selecting, from the database of articles, articles that match the images of the bulk body inputted into the electronic device both in terms of the correspondence of the three-dimensional models of the articles to the identified three-dimensional model of the bulk body including parameters and in terms of suitability of the articles for use with the bulk body, based on the comparison by the module for comparing, and a module for sending the results of the comparison to the user, the module for sending results of the comparison to the user being connected to the module for selecting the articles which match the bulk body.

2. The electronic device according to claim 1, wherein the module for selecting from the database of articles with three-dimensional models of the articles in question the articles which match the bulk body inputted into the electronic device has a block for generating signals to the user client devices to ask additional questions to the user in view to narrow the selection of articles.

3. The electronic device according to claim 1, wherein the server is connected to a user client device, and the module for sending results of the comparison to the user client devices is configured to request display of the article or articles selected as results of the comparison on the user client device.

4. The electronic device according to claim 1, wherein, in the selecting, the module for selecting is configured to verify that the three-dimensional model of the bulk body of the user does not exceed the boundaries of the matching article.

5. The electronic device according to claim 1, wherein the stored three-dimensional models of bulk bodies include stored three-dimensional models of (i) at least one of buildings and parts thereof, (ii) objects and parts thereof, and (iii) at least one of human bodies and parts thereof.

6. The electronic device according to claim 1, wherein the parameters of the bulk bodies in each of the stored three-dimensional models of bulk bodies include dimensions of the respective bulk bodies.

\* \* \* \* \*